Figure 9:
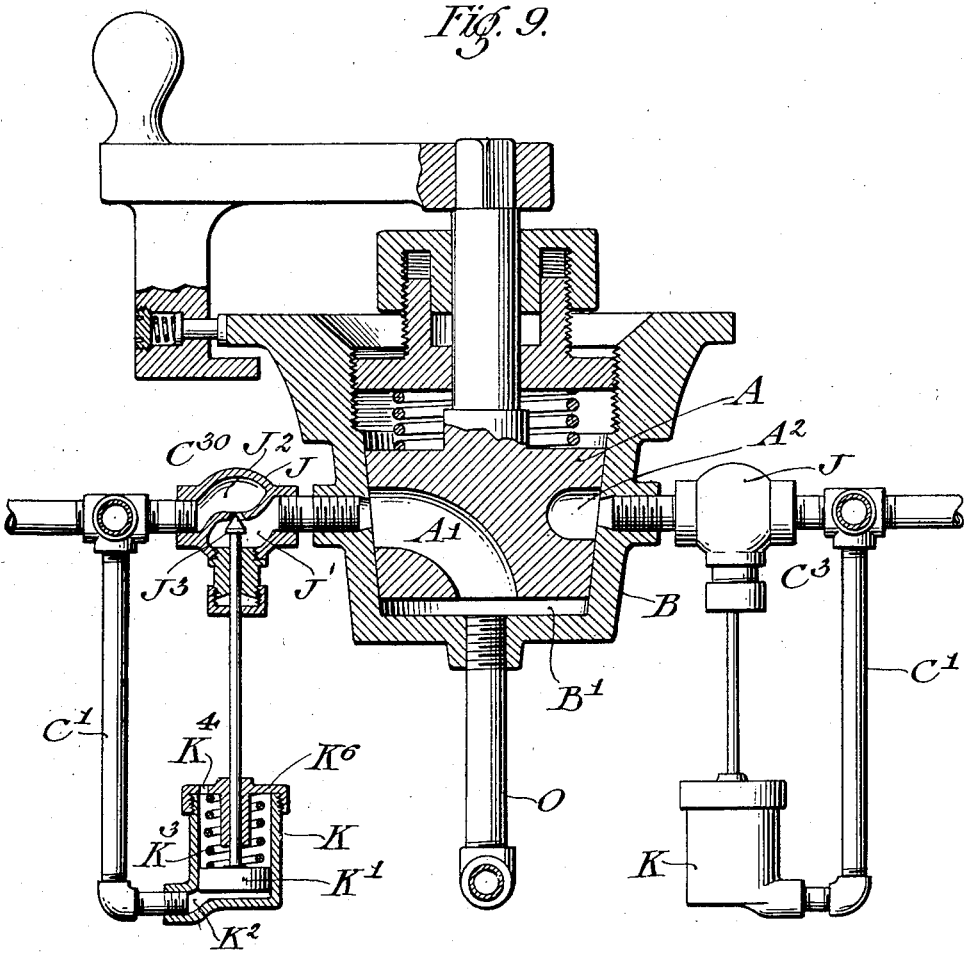

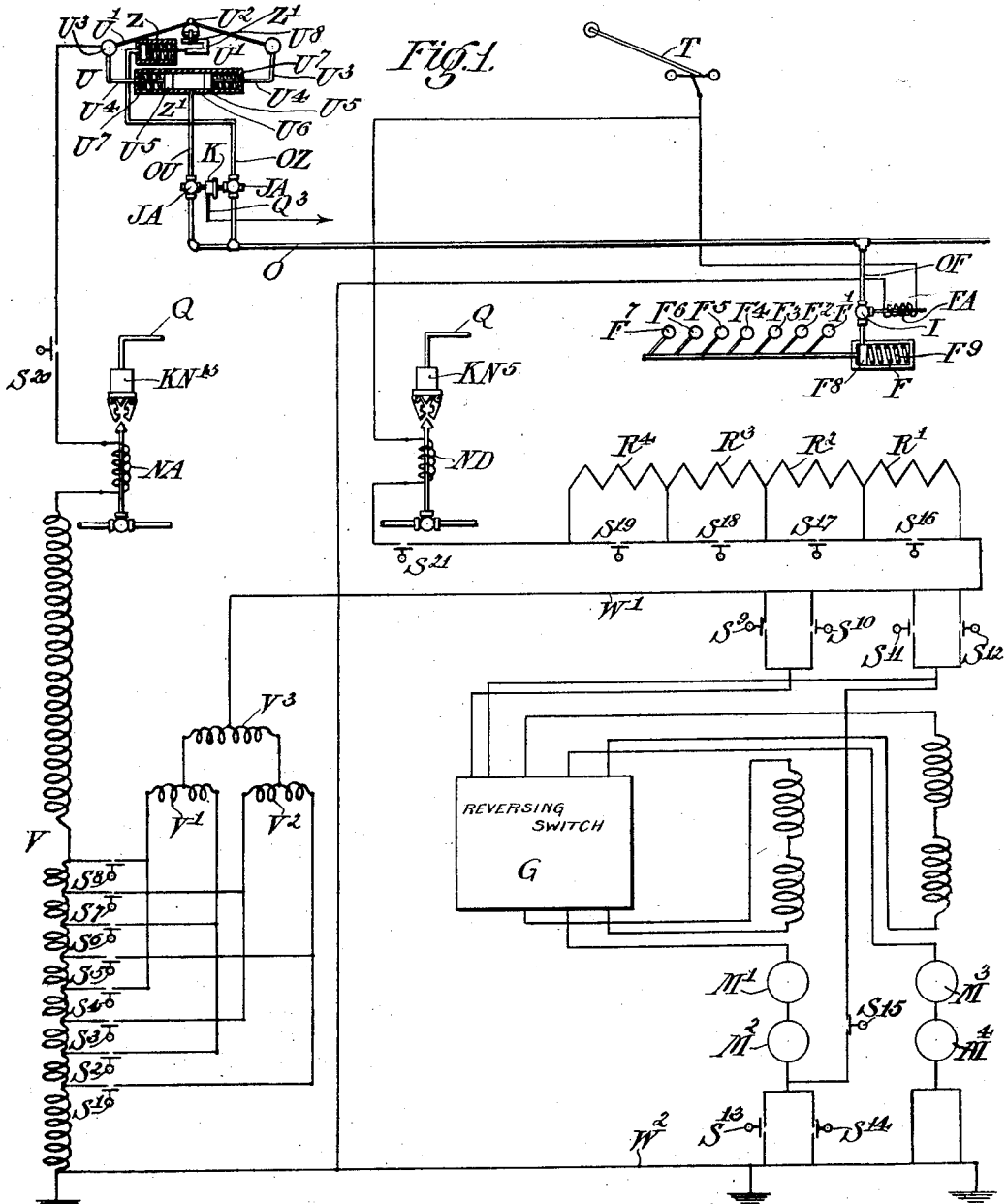

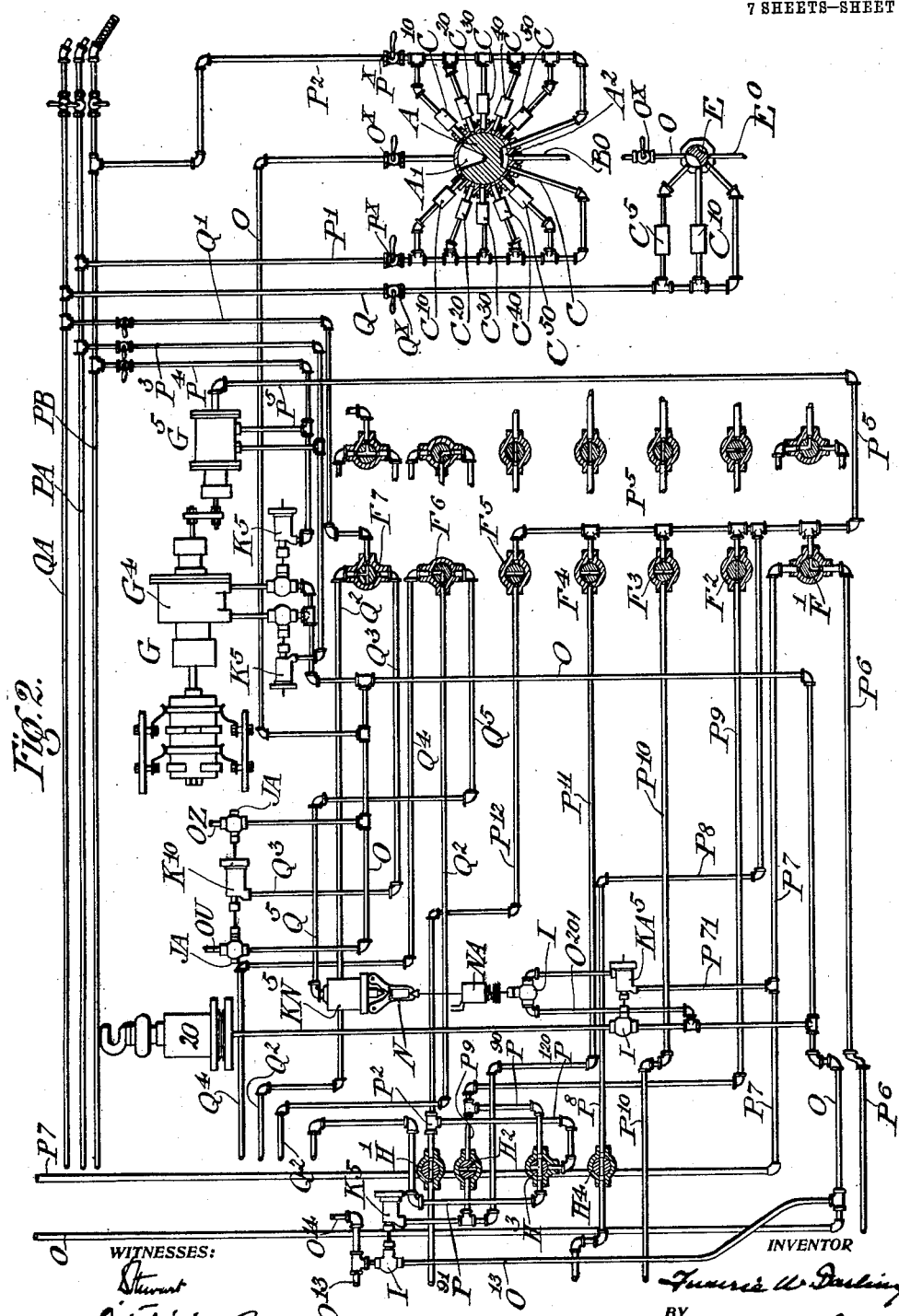

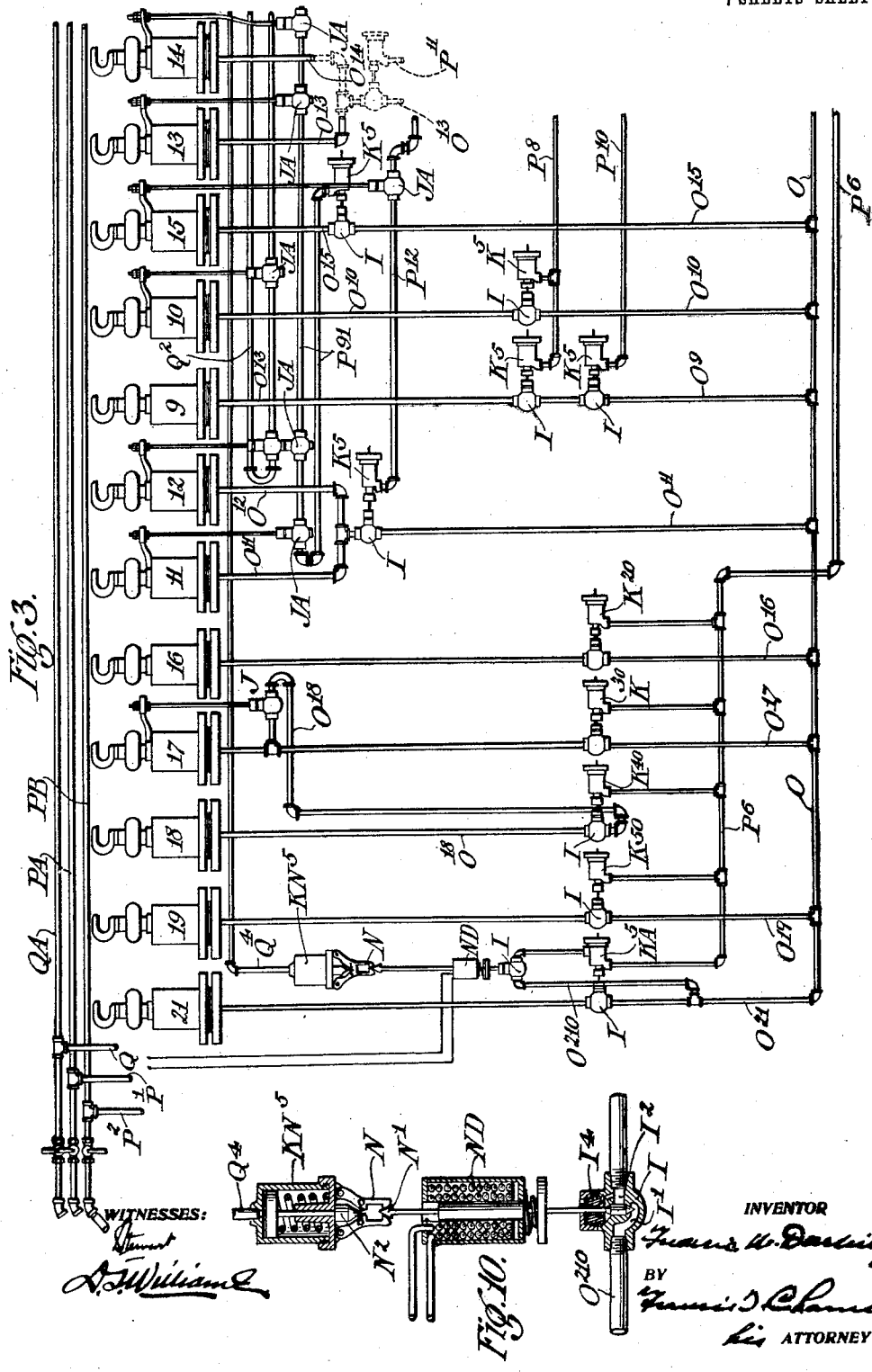

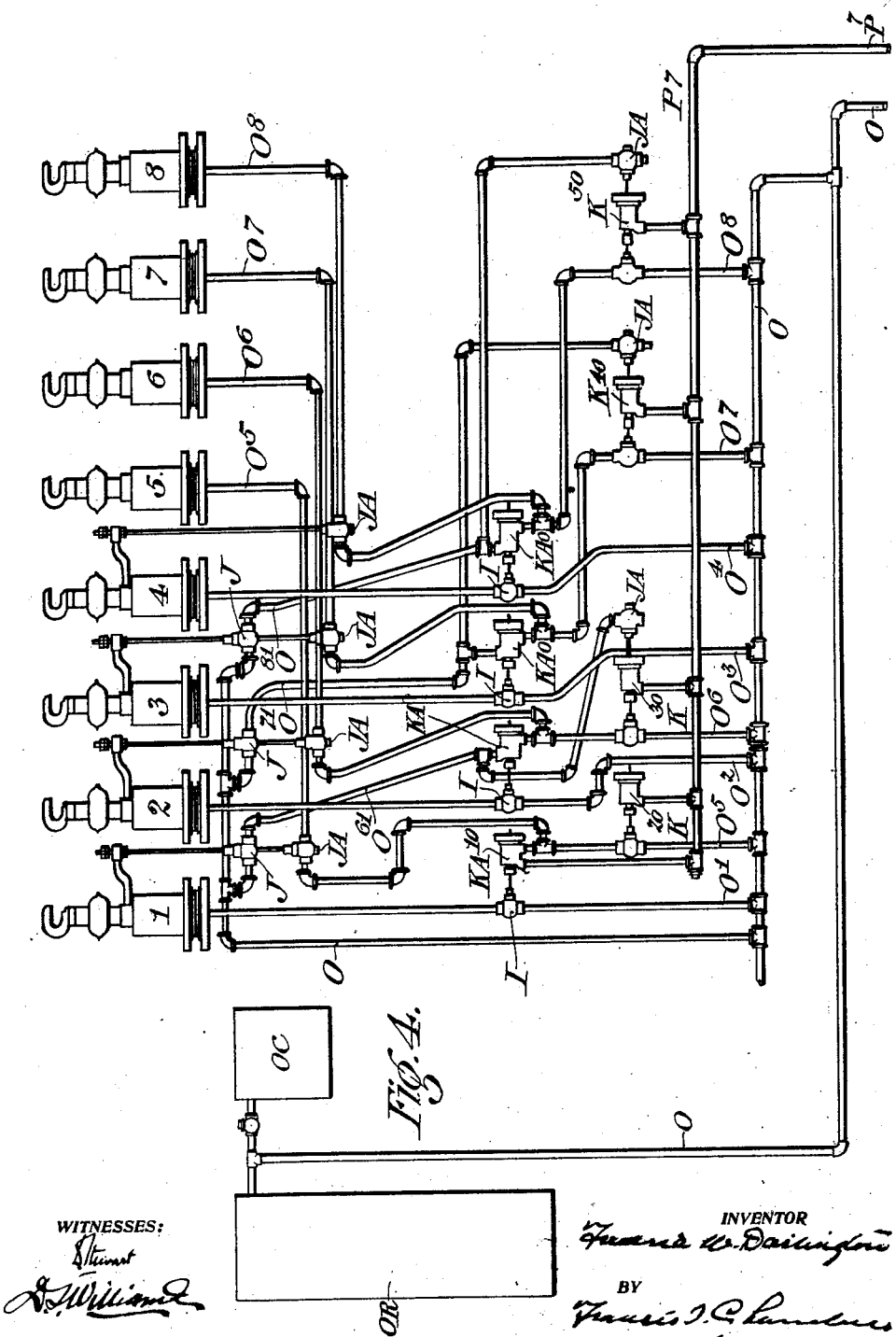

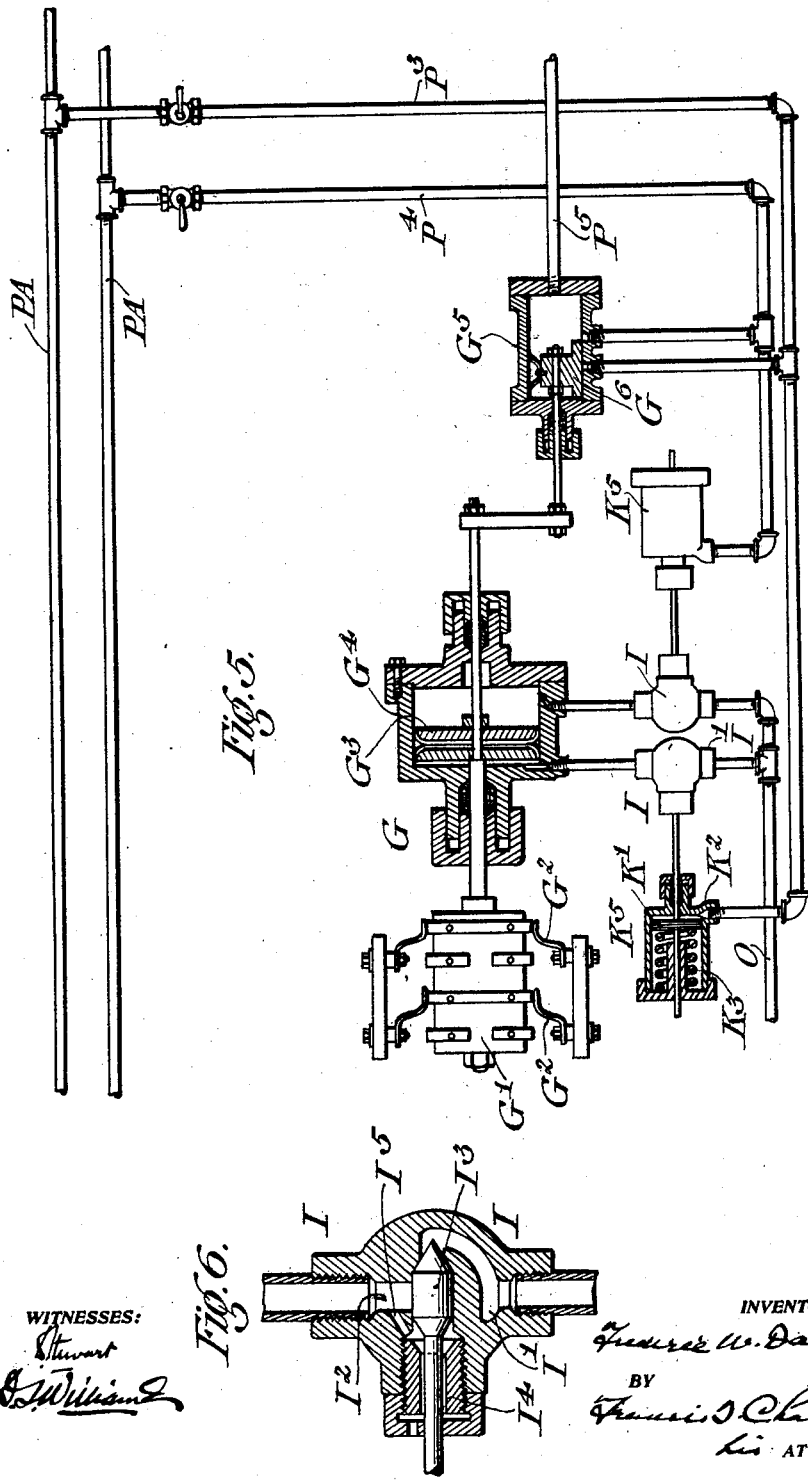

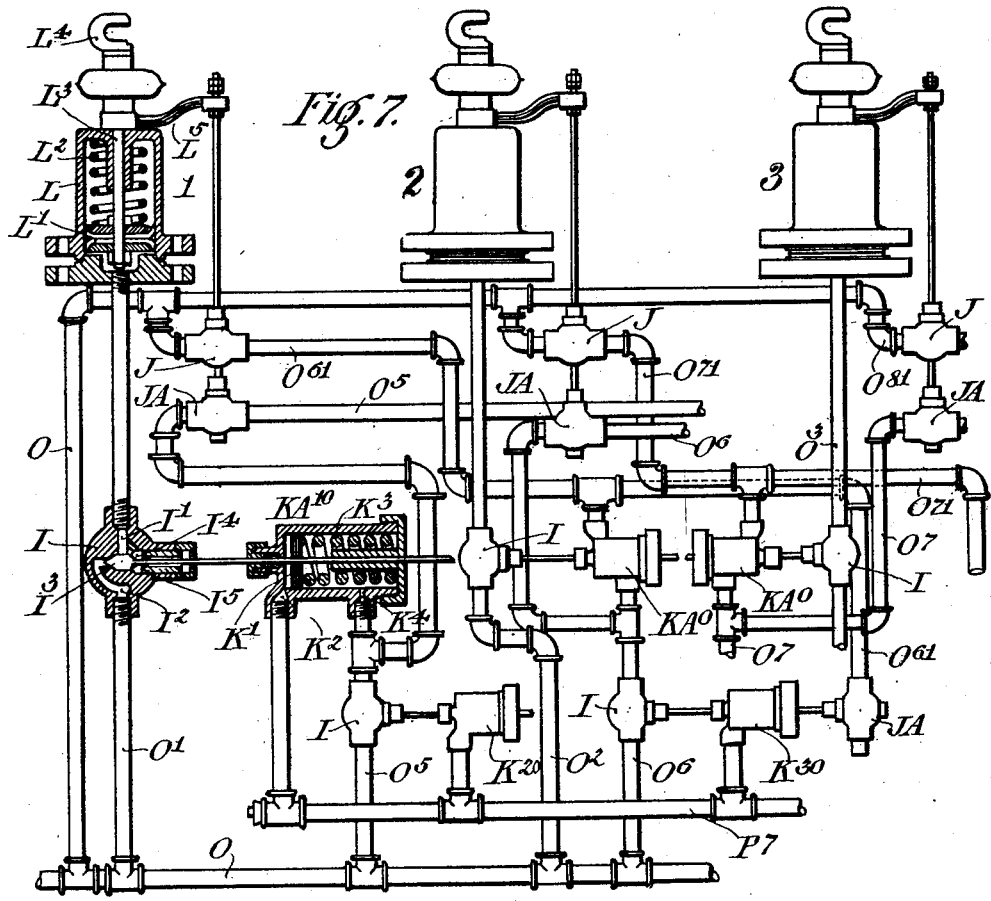
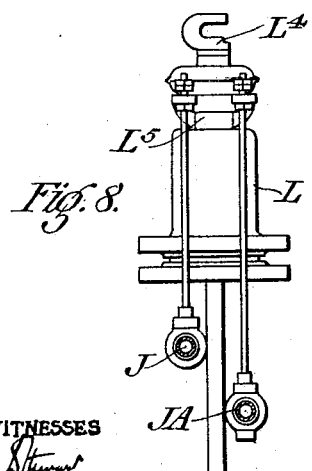
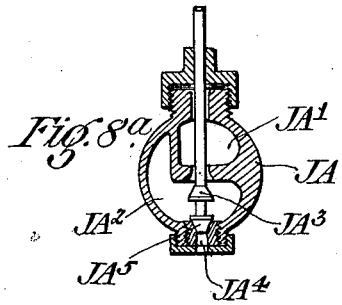

F. W. DARLINGTON.
APPARATUS FOR CONTROLLING MOTORS.
APPLICATION FILED DEC. 14, 1909.

1,005,420.

Patented Oct. 10, 1911.

7 SHEETS—SHEET 7.

WITNESSES
INVENTOR
Frederic W. Darlington
BY
his ATTORNEY.

UNITED STATES PATENT OFFICE.

FREDERIC W. DARLINGTON, OF PHILADELPHIA, PENNSYLVANIA.

APPARATUS FOR CONTROLLING MOTORS.

1,005,420.  Specification of Letters Patent.  Patented Oct. 10, 1911.

Application filed December 14, 1909. Serial No. 533,022.

*To all whom it may concern:*

Be it known that I, FREDERIC W. DARLINGTON, a citizen of the United States of America, residing in the city and county of Philadelphia and State of Pennsylvania, have invented a certain new and useful Improvement in Apparatus for Controlling Motors, of which the following is a true and exact description, reference being had to the accompanying drawings, which form a part thereof.

The present invention relates to apparatus for controlling electric motors, and, though not limited in all respects to such use, was primarily devised for controlling the various electric motors of a single motor-driven railway car or a plurality of such cars connected together in a train from a single point or controlling station by means of pneumatically actuated and controlled switch actuators or controllers.

In the system or arrangement of apparatus specifically disclosed herein, the motors are intended to be operated by direct current under certain conditions and by alternating current under other conditions, and one object of the invention is to provide a simple, effective and reliable pneumatically actuated and controlled apparatus for altering the various electrical connections of motors in general accordance with a mode of operation which, so far as the motor connections and the changes therein are concerned, is already known and in use.

Another object of the invention is to provide the control apparatus for operating motors in accordance with the particular system specifically disclosed, with certain additional safeguards and advantageous characteristics.

A further object of the invention is to provide a simple, reliable and effective pneumatically actuated and controlled motor control system for the motors on a single car or on a train composed of two or more motor-driven cars having a small number of train pipes or control lines. This I accomplish in part by, and an important feature of my invention consists in, the provisions made for utilizing a main pressure supply, which may be connected to and be formed in part by the air brake reservoir or reservoirs, for supplying air for moving the switches and performing other operations involving a substantial use of air, while controlling the passage of air from the constant air pressure supply system to the various devices actuated thereby through pilot valves having pneumatic actuators connected to, and selectively operated according to the pressure in, a second air supply system in which the pressure may be varied quickly and by definite and predetermined steps.

Other objects of the invention will appear in connection with the detailed description of the embodiment of the invention specifically disclosed herein, and for a full understanding of the invention reference should be had to the accompanying drawings and descriptive matter, as well as to the claims annexed to the specification and in which I have aimed to point out with particularity the various features of novelty which characterize my invention.

Figure 11:
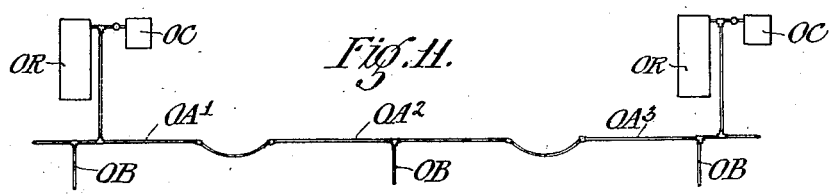

Of the drawings, Figure 1 is a diagrammatic representation of the electrical circuits and connections for operating with direct current under some conditions and with alternating current under other conditions, a plurality of motors for driving a single car. Fig. 1$^A$ is a table showing what switches are closed in the different controller positions. Figs. 2, 3 and 4 jointly form a diagrammatic representation of the pneumatically actuated and controlled apparatus for manipulating the various switch connections of the motor system shown in Fig. 1. Fig. 5 is a view, partly in section, and on a larger scale than Fig. 2, showing a portion of the apparatus shown in Fig. 2. Fig. 6 is a section on a larger scale than Fig. 5, of one of the valves of Fig. 5. Fig. 7 is a view, partly in section, and on a larger scale than Fig. 4, showing a portion of the apparatus shown in Fig. 4. Fig. 8 is a partial elevation taken at right angles to Fig. 7, illustrating a detail of construction. Fig. 8$^A$ is a section of one of the valves shown in Fig. 8. Fig. 9 is a vertical sectional elevation of the valve employed as a master controller, and connections. Fig. 10 is a sectional elevation of the mechanism for tripping and holding open one of the main line switches, and Fig. 11 is a diagrammatic representation of a slight modification.

The diagram of Fig. 1 represents the electrical connections of a motor system which, in its general aspects, is well known and in commercial operation. In this diagram, M' and M$^2$, and M$^3$ and M$^4$, are motors normally connected together in pairs. Switches S$^9$ to S$^{15}$, inclusive, are employed for connecting all four motors in series between the conductors W' or W² or for connecting the two pairs of motors in multiple between these conductors. In the particular system disclosed the two pairs of motors are intended to be connected together in series under normal conditions when supplied with direct current and to be normally connected in multiple when supplied with alternating current. It will of course be understood that the general use of the invention is in no wise restricted to a system having four motors or any particular number of motors to the car.

G represents the reverser for reversing the connections of each motor armature and its field winding relative to each other in order to change the direction of rotation of the motor.

T represents the trolley through which direct current is supplied to the motors; $S^{21}$, the direct current line switch; ND the overload tripping coil for switch $S^{21}$; R', R², R³, and R⁴ resistance sections; and $S^{16}$, $S^{17}$, $S^{18}$ and $S^{19}$ switches for cutting these resistance sections out of the motor circuit.

FA represents a coil controlling the operation of the device F for shifting the change over valves F' to F⁶ hereinafter referred to. The coil FA is energized whenever the trolley T is connected to a source of current.

U represents the pantograph for supplying alternate current to the motors; $S^{20}$ the alternate current line switch; NA the overload tripping coil for switch $S^{20}$; V the auto transformer for reducing the voltage of the current supplied to the motors; and V', V² and V³ inductive windings which may be connected in various ways to the winding of the transformer V. The supply line W' is connected to the middle of the winding V³, and the ends of the winding V³ are connected to the middle points of the windings V' and V², and the tap connections between the windings V' and V² and the transformer V are arranged as is usual. These tap connections are opened and closed by switches S' to S⁸, inclusive.

The table of Fig. 1ᴬ shows how the different switches open and close as the controller is moved through the various positions. The numbers in the column of figures at the left indicate the different controller positions, and the figures in the other column are the exponents of the switches S' to $S^{21}$ closed in the different controller positions.

The various pipes, valves, and pneumatic actuators by which the reverser is controlled and operated, the line switch trips are reset, and the various switches S' to $S^{21}$ are operated, are shown collectively by Figs. 2, 3 and 4, when Fig. 2 is placed at the right of Fig. 3, and Fig. 4 is placed above Figs. 2 and 3, with the broken pipes at the margin of the different figures brought together. In general the system in the form illustrated comprises switch actuators 1 to 21, inclusive, one for each of the switches S' to $S^{21}$, respectively, on each car; a constant air pressure supply system O connected to the brake reservoir or other receptacle for compressed air on the car, and supplying air for operating the switch actuators 1 to 21, inclusive, and certain other devices; train pipes PA and PB for supplying air of the various variable pressures desired for controlling the flow of air from the system O to the switch actuators 1 to 21, inclusive, through valves and piping to be hereinafter described; a hand operated valve A forming the master controller for supplying air from the constant pressure source at the different pressures to one or the other of the train pipes PA and PB, depending upon the direction of motion of the car or train; a reverser G operated in one direction or the other to correspondingly change the direction of movement of the car accordingly as the master controller supplies air to the pipe PA or to the pipe PB; and a valve E adapted to supply air at variable pressures to a train pipe QA to thereby reset one or the other of the two line switches when necessary or desirable, and also for controlling the pantograph. In addition there are the change over valves F', F², F³, F⁴, F⁵, F⁶ and F⁷, already referred to, which are shifted into, or maintained in, the position in which the valves are shown connected into the pipe system in Fig. 2 when direct current is supplied to the system, and are shifted into or maintained in the position in which the valves are shown connected to the broken pipes in Fig. 2 when alternate current is supplied.

H', H², H³ and H⁴ represent motor cut out valves which are normally in the position shown in Fig. 2, but may be manipulated as hereinafter described in order to cut out the pair of motors M' and M², or the pair of motors M³ and M⁴ under certain conditions.

In the simple form shown, A represents the body of the valve forming the master controller. This valve is formed with a port A' open at its lower end to the chamber B' at the lower end of the valve casing B, this chamber being connected to a branch of the constant air pressure supply system O. The valve body A is also formed with an exhaust port A² diametrically opposed to the port A' but not extending to the bottom of the valve body, and consequently out of direct communication with the chamber B'. The valve casing B is provided with an exhaust port and connections BO leading therefrom in communication with port A² when the controller is in the neutral position. The valve body B is also provided with a left hand set of ports connected to the train pipe PA by a pipe P' and a right hand set of ports connected to the train pipe PB by a pipe P². The port of each set adjacent the exhaust connection BO is connected directly to the corresponding end of the pipe P'. The other ports of each set are connected to the corresponding pipe P' or P² through automatic pressure reducing valves $C^{50}$, $C^{40}$, $C^{30}$, $C^{20}$ and $C^{10}$, respectively. The valves $C^{10}$, $C^{20}$, $C^{30}$, $C^{40}$ and $C^{50}$ may be identical in their general construction and arrangement but are so proportioned or devised that when exposed on their inlet sides to a proper pressure each will open when the pressure on its outlet side is below a certain definite value and will close when the outlet pressure reaches that value.

As shown in Fig. 9, each of the valves designated by C with the proper exponents, comprises a valve proper J and an actuator K therefor. The valve J comprises a casing formed with an inlet chamber J', an outlet chamber J², and a port connecting the two chambers and controlled by the valve member J³. The stem of each member J³ is connected to the piston K' of the corresponding actuator K. A spring K³ acts on the piston K' in a direction to move it and the valve member J³ connected thereto into the position in which the latter opens the port controlled by it. The pressure in the outlet chamber J² of each valve J is transmitted by a pipe C' and port K² to the cylinder in which the piston K' works. The pressure, thus permitted to act on piston K' opposes the action of the spring K³ and when the pressure reaches or exceeds a certain value fixed by the character of the spring K³ and the area of the piston K', the piston K' and valve member J³ are moved so that the latter closes the port controlled by it. A port K⁴ permits of the entrance and escape of air into and from the end of the cylinder not connected to pipe C'. Some adjustment of the tension of each spring K³ may be had by adjusting the cylinder cap K⁶.

The different outlet pressures at which the valves $C^{10}$, $C^{20}$, $C^{30}$, $C^{40}$ and $C^{50}$ are set to close, are indicated by the exponents of the designating symbol C. For instance, where the pressure in the system O is in the neighborhood of one hundred pounds each valve $C^{10}$ may be advantageously arranged to maintain a pressure in the train pipe PA or PB to which it is connected through the pipe P' or P², of ten pounds; each valve $C^{20}$, a pressure of twenty pounds; each valve $C^{30}$ a pressure of thirty pounds; each valve $C^{40}$ a pressure of forty pounds; and each valve $C^{50}$ a pressure of fifty pounds. When the master controller valve is in the position shown in Fig. 2, each of the train pipes PA and PB is connected to the exhaust connection BO. When the valve is turned, however, from the position shown, either to the right or to the left, the valve body port A' is brought into register with first one and then another of the casing ports to which the valves $C^{10}$, $C^{20}$, $C^{30}$, $C^{40}$ and $C^{50}$ are connected, and thus by turning the valve in one direction or the other into any particular desired position, a corresponding pressure will be maintained in the one or the other of the train pipes PA and PB.

The train pipes PA and PB are connected by pipes P³ and P⁴, respectively, with the chambers of corresponding pneumatic valve actuators or devices K⁵ which control the admission of air from the system O through corresponding valves I to the opposite ends of the reverser actuating cylinder G⁴. Each valve I shown best in Fig. 6 has an inlet chamber I' connected to the supply system O, an outlet chamber I², a valve member I³ adapted to open and close communication between the chambers I' and I², leakage ports I⁴ and through which air may escape from the chamber I' when the valve I³ closes communication between the chambers I' and I², said leakage port I⁴ being closed however by the valve member I³ when the latter opens communication between chambers I' and I². The devices K⁵, as well as the other devices K and KA hereinafter referred to with various exponents, are identical in construction, and the exponents in the case of each of these devices, excepting those forming part of the pressure reducing valves C with the various exponents, indicate the pressure at which the devices operate. As air is admitted to one end or the other of cylinder G⁴, the piston G³ is moved accordingly. The stem of the piston G³ is connected to the drum G' carrying the movable reverser contacts for connecting the motors for operation in one direction or the other. The stem of the piston G³ is also connected to a slide valve G⁶ working in a valve chamber G⁵ to thereby connect one or the other of the two train pipes PA and PB through the pipes P³ and P⁴ to a pipe P⁵.

The pipe P⁵ has branches connected to the inlet ports of the change over valves F', F², F³, F⁴ and F⁵. From the change over valve F' lead outlet pipes P⁶ and P⁷ and from the valves F², F³, F⁴ and F⁵ lead outlet pipes P⁹ to P¹², respectively. The pipes P⁶, P⁷, P⁹, P¹⁰, P¹¹ and P¹² and a branch pipe P⁸ of the pipe P⁵ not passing through any change over valve serve through the various valves and pipe connections hereinafter described, to control the various motor switches S' to S¹⁹, inclusive. The various switch actuators 1 to 19, inclusive, as well as the actuators 20 and 21, for the line switches S²⁰ and S²¹, are alike and each comprises a cylindrical casing L, as shown in Fig. 7, a piston L' working in the cylinder, a spring L², and a switch engaging portion shown in the form of a hook $L^4$ connected to the piston rod $L^3$. The spring $L^2$ normally holds the piston rod $L^3$ and hook $L^4$ down, as shown in Fig. 7, but yields to permit them to rise when air under pressure from the supply system O is admitted to the lower end of the casing L. Each of the actuators 1 to 21, inclusive, is connected to the air pressure supply system O through a branch pipe $O'$ to $O^{21}$, inclusive, respectively, each controlled by one or more valves I, operated each by a device like the selective actuators K, $K^5$, already described, and designated by the symbol K or KA with a suitable exponent. In general there is an individual pipe for each of the actuators 1 to 21 leading directly from the constant air pressure supply system to the various switch actuators, and an individual valve I in each pipe, but in the case of actuators 11 and 12, a single valve I is employed with only one branch $O^{11}$ running to the inlet side of the valve from the air pressure supply system O. A similar arrangement is employed in the case of actuators 13 and 14 where $O^{13}$ designates the supply branch. In the case of actuator 18, the air supply conduit $O^{18}$ therefor is controlled by its individual valve, but is connected not directly to the constant air pressure supply but to the pipe $O^{17}$ on the outlet side of its controlling valve. In addition, the pipe $O^{18}$ is closed except when the switch actuator 17 is energized by a normally closed valve J, like the valve J already described, and having its stem connected to an arm $L^5$ of the actuator 17.

In the off position of the master controller the various switches $S^9$ to $S^{15}$, inclusive, which I may call the motor switches proper, are open, and the first step in the operation of starting the motors into operation consists in closing the proper ones of these switches. When the motor is to be operated with direct current the only switches of this group which need to be closed are switches 10 and 15. It should be explained that the switches 9 and 10 are duplicates of each other and that only one of these switches is required to handle the direct current, while on account of the amount of current, both switches are necessary to handle the alternate current. Similarly, switches $S^{13}$ and $S^{14}$ are duplicates of each other and the same is true of switches $S^{11}$ and $S^{12}$. The switches $S^{11}$, $S^{12}$, $S^{13}$ and $S^{14}$, however, are all open in normal operation with direct current. The proper switches of the group $S^9$ to $S^{15}$, are closed at the instant at which the master controller is moved to the first notch in either the forward or reversed direction, for the various selective devices $K^5$ controlling the operation of the switch actuators 10 to 15, are set to open at a suitable pressure as that of five pounds which is less than the pressure of ten pounds supplied to the train pipes by the valves $C^{10}$. The pipe $O^{10}$, supplying air from the pressure system O to the actuator 10 is controlled by an actuator $K^5$ supplied with air through the pipe $P^8$ when the motor cut out valve $H^4$ is in the normal open position. The selector $K^5$ controlling the admission of air from the constant pressure system O through the pipe $O^{15}$ to the actuator 15 is actuated by air passed to it through the conduits $P^9$, $P^{90}$ and $P^{91}$. It should be observed that the pipe $P^{91}$ is closed except when the actuators 11, 12, 13, and 14, are all in their normal unenergized condition by the valves JA connected to the actuators 11, 12, 13 and 14. The valves JA (see Fig. 8) are substantially like the valves J except that they open when their stems are pushed in, and that they have leakage ports $JA^4$, from their outlet chambers, closed by a valve port $JA^5$ when the valve proper is open.

In the case of alternate current operation, all of the group of motor switches $S^9$ to $S^{15}$, inclusive, except switch $S^{15}$, should close on the initial actuation of the controller. The change over valves do not affect the pipe $P^8$, and consequently actuator 10 is operated as before when the controller is thrown into the first condition. The pipe $P^8$ also serves to energize one of the selectors $K^5$ controlling the pipe $O^9$. The other selector $K^5$, controlling the pipe $O^9$, is simultaneously operated by the pipe $P^{10}$ running from the change over valve $F^3$, open in the alternate current condition. The pipe $O^{11}$ supplying air to the actuator 11 directly and to the actuator 12 through pipe $O^{12}$, is controlled by the selector $K^5$ supplied with air by the pipe $P^{12}$ connected to the change over valve $F^5$ open in the alternate current condition. The selector $K^5$ controlling the pipe $O^{13}$ feeding the actuators 13 and 14, is supplied with air in normal operation by the pipe $P^{11}$ running from the change over valve $F^4$ when in the alternate current position. It will be observed that the actuator 15 controls a valve JA which closes the pipe $P^{12}$ when the actuator 15 is energized, and as before noted, the pipe 91 supplying air to the actuator $K^5$ of the pilot valve controlling the pipe $O^{15}$ is controlled by the valves JA connected to the actuators 11, 12, 13 and 14, to close off the pipe when any one of these actuators is energized. This arrangement provides an interlock which effectually prevents the switch 15 from being closed when the other switches of the group are closed, and prevents the switches 11 and 12, and 13 and 14 from being closed when the switch 15 is closed. The proper line switch actuator 20 or 21 is operated as hereinafter described when the proper ones of the actuators 9 to 15 are energized for alternate or direct current operation.

Assuming that the controller has been moved into the first position for direct current operation, and that the switches $S^{10}$ and $S^{15}$ have been closed, the next step in bringing the motors up to speed is to successively cut out the resistance sections $R'$, $R^2$, $R^3$ and $R^4$. This is accomplished by energizing the switch actuators 16, 17, 18 and 19 to close the switches $S^{16}$, $S^{17}$, $S^{18}$ and $S^{19}$. The energization of actuators 16, 17, 18 and 19 is controlled by the selective valve actuators $K^{20}$, $K^{30}$, $K^{40}$ and $K^{50}$, which are all supplied with air from the pipe $P^5$ by the pipe $P^6$ when the valve $F'$ is in the direct current position. As indicated, the selective valve actuators controlling the energization of switch actuators 16, 17, 18 and 19 are set to respond progressively as the controller is moved through the various positions. In addition, the energization of actuator 18 must always follow the operation of the actuator 17 regardless of the rate at which the controller handle is swung around, because air is supplied to the actuator 18 only after the actuator 17 has been energized, and the valve $J$ in the pipe $O^{18}$ controlled by the actuator 17 has been moved from its normally closed position into its open position.

In alternate current operation, assuming that the switches $S^9$ and $S^{10}$, $S^{11}$, $S^{12}$, $S^{13}$ and $S^{14}$, have been closed as before described on the first movement of the controller, subsequent movements of the controller bring into operation the actuators 1 to 8, inclusive, and the controlling switches $S'$ to $S^8$, inclusive, by air passing from the pipe $P^5$ to and through the pipe $P^7$ leading from that outlet of the valve $F'$ which is open in the alternate current position of the change over valves, but is closed in their direct current position. The actuator 1 is directly and immediately controlled by the valve $I$ connected to the actuator $KA^{10}$ (see Figs. 4 and 7), the actuator $KA^{10}$ having its inlet port $K^2$ connected to a branch from the pipe $P^7$. The various actuators KA are like the actuators K except that the port $K^4$ of each actuator KA is not connected directly to the atmosphere but to a pipe which may be connected to a supply of air under pressure. In consequence, the actuator 1 is operated as soon as the pressure in the pipe $P^7$ rises to ten pounds. The energization of switch actuator 1 brings about the energization of switch actuator 2 for the valve $I$ in the pipe $O^2$ is connected to a valve actuator $KA^0$ actuated by air from the constant pressure system through pipe $O^{61}$ normally closed by a valve $J$ connected to the actuator 1 and opened when the latter is energized. Similarly, the energization of actuator 2 controls through pipe $O^{71}$ the energization of actuator 3, and the energization of actuator 3 controls through pipe $O^{81}$ the energization of actuator 4. It will thus be seen that the energization of selector $KA^{10}$, of Figs. 4 and 7, brings about the operation of the actuators 1, 2, 3 and 4, one after another in alternate current operation as soon as the controller is moved into the position in which air is passed to the train pipes from one or the other of the valves $C^{10}$. This closes the switches $S'$, $S^2$, $S^3$ and $S^4$ in the desired order for making the low voltage connection between the transformer V and the motor.

When the controller is moved into the position in which air is admitted to the train pipe PA or PB through one of the valves $C^{20}$, the selector $K^{20}$ controlling the pilot valve in pipe $O^5$ is operated. This admits air to the port $K^4$ of valve actuator $KA^{10}$ which is operated at once to close the valve $I$ in the pipe $O'$ and return the actuator 1 to the normal position in which the switch $S'$ is open. Until the actuator 1 returns to its normal position air cannot flow through the pipe $O^5$ because the pilot valve JA in the upper portion of the pipe $O^5$, which is connected to the arm $L^5$ of the actuator 1, is closed except when the actuator 1 is in the unenergized position. When this position is reached air may flow through the pipe $O^5$ to the actuator 5 to operate the latter. Similarly, it will be understood that as the selectors $K^{30}$, $K^{40}$ and $K^{50}$ are operated on progressive movements of the controller, the switch actuator 2 is deënergized and switch actuator 6 is energized, the switch actuator 3 deënergized and the switch actuator 7 energized, and the switch actuator 4 deënergized and the switch actuator 8 energized, thus bringing the motors up to speed for alternate current operation. To exhaust the pipes $O^{61}$, $O^{71}$ and $O^{81}$ when the actuators $KA^0$ connected to them are returned to their normal condition through the operation of the devices $K^{30}$, $K^{40}$ and $K^{50}$, respectively, as described, each of the actuators $K^{30}$, $K^{40}$ and $K^{50}$ has connected to it a valve JA. These valves JA open the pipes $O^{61}$, $O^{71}$, and $O^{81}$, to exhaust as the devices $K^{30}$, $K^{40}$ and $K^{50}$ are energized. The pipe $P^6$ is also connected to a selector $KA^5$ controlling a pilot valve in the pipe $O^{21}$ running to the direct current line switch actuator 21. In consequence, the line switch $S^{21}$ is normally closed by the energization of actuator 21 as soon as the controller is moved into the first position in direct current operation, and of course remains closed normally until the controller is returned to the off position. When, however, the overload coil ND is energized a pilot valve $I$ in the branch pipe $O^{210}$ is opened to admit air from the constant pressure supply system to the port $K^4$ of the selector $KA^5$. This instantly returns the latter to the position in which the valve $I$ in the pipe $O^{21}$ is closed whereupon the actuator 21 is returned to the normal position, opening the line switch $S^{21}$. When the coil ND is attracted its armature and the valve connected to the latter are held elevated by the hooks N of the resetting device $KN^5$ until the latter is actuated by the admission of air of the proper pressure of five pounds through the pipe $Q^4$. The device $KN^5$ is like the other devices K except that the cylinder supports hooks N which are spring held (see Fig. 10) in position to engage the collar N' on the stem of the valve in pipe $B^{210}$ except when the piston of device $KN^5$ is depressed and the wedge $N^2$ connected to the piston spreads the hooks N. The alternating current line switch actuator 20 is operated in the same manner and is tripped when the overload coil NA is energized. Actuator $KA^5$ for valve I in pipe $O^{20}$ is controlled by branch $P^{71}$ of pipe $P^7$. Pipe $O^{201}$ corresponds in purpose to $O^{210}$. The resetting device $KN^5$ for the alternating current line switch is reset by air of the proper pressure of five pounds admitted through the pipe $Q^5$. After either line switch has been tripped, air is supplied to the corresponding resetting devices $KN^5$ from a pipe $Q^2$, through one or the other of pipes $Q^4$ or $Q^5$, depending on the position of the change over valve $F^6$. The pipe $Q^2$ is connected to a train pipe QA by pipe $Q'$ and change over valve $F^7$ in either position of the latter. The pipe $Q^2$ is controlled by valves JA connected to the actuators 10 and 12, so that neither of the two reset devices $KN^5$ can be operated except when the controller valve A is in the neutral position.

Air at the proper pressure is supplied to the train pipe QA from the supply system O through a pipe Q and valve E which may be similar to the main controller valve A but has only two pressure reducing valve connections to the pipe. $E^0$ represents the exhaust connection. The connection containing the valves $C^5$ supplies air for operating the alternate and direct current resetting devices $KN^5$. The connection containing valve $C^{10}$ supplies air for operating the pantograph U. For this purpose a pipe $Q^3$ runs to the actuator $K^{10}$ controlling a normally open valve JA in the supply system branch OU and a normally closed valve JA in the supply system OZ. It will be observed that change over valve $F^7$ connects pipes $Q^3$ and $Q'$ only in the alternate current position of the change over valves. The operation of the pantograph will be apparent from the diagram of Fig. 1. As there shown, the pantograph U comprises sections U' hinged together at $U^2$ and hinge connected at $U^3$ to the upturned ends of piston rods $U^4$ connected to pistons $U^5$ working in a common cylinder $U^6$. Compressed air for separating the pistons $U^5$ is admitted to the cylinder $U^6$ through the pipe OU for the purpose of separating the pistons $U^5$ and drawing the pantograph down out of engagement with the overhead conductor. When the pipe OU does not supply air to cylinder $U^6$, springs $U^7$ tend to hold the pantograph against the overhead conductor with the desired pressure.

To releasably lock the pantograph down except under operating conditions a piston and cylinder device Z is employed. Except when pressure is admitted to the device Z by the pipe OZ, a spring in the cylinder of device Z causes the bent piston rod extension Z' to extend into position to be engaged by hooks $U^8$ attached to the pantograph, and which may be generally like the hooks N of the resetting device. When pressure is supplied to device Z by pipe OZ the extension Z' is moved out of line with the hooks $U^8$.

In operation except when the valve E is in position to supply air at a pressure of ten pounds or more to train pipe QA the valve JA in pipe OU will be open and the valve JA in pipe OZ will be closed, and in consequence the pantograph will be held down and locked down. When the valves in pipes OU and OZ are shifted the pantograph goes up. In case of accident as when the cars of a train pull apart and the train pipes open, the pressure in pipe QA falls immediately to a point at which valve JA in pipe OU is open and valve JA in pipe OZ is closed. Ordinarily under such conditions sufficient pressure will be maintained in the supply system O on the car long enough at least to depress the pantograph and bring the hooks $U^8$ into the reach of the arm Z.

As shown in Fig. 1 the change over valves F' and $F^7$ are normally held in the alternate current position by the spring $F^9$ acting on the piston $F^8$ working in the cylinder F. Air is admitted to the cylinder F to shift the valves through supply branch OF controlled by valve I which is opened when and only when coil FA is energized. This occurs only when direct current is supplied to trolley T.

It may be well to briefly point the manner in which the various pneumatic connections and devices are established and actuated in normal operation of the system, although this involves some repetition of what has already been stated. When the master controller valve A is moved into the first position to move the car in one direction or another, for instance when the valve A is moved in the clockwise direction, air passes from the supply system O through the valve A, the pressure reducing valve $C^{10}$ (to the right in Fig. 2), and pipe $P^2$ to the train pipe PB. In each car air then passes from the train pipe PB through the pipe $P^4$ to the cylinder of valve $G^5$ and to the corresponding one of the two valve actuators $K^5$ pertaining to the reversing cylinder $G^5$ whereby the latter is shifted into, or maintained in, the proper position by air from the supply system O passing to it through the valve I controlled by the valve actuator $K^5$ thus actuated. The reversing cylinder $G^4$ controls the valve $G^5$ and shifts or maintains the latter in the proper position so that the air entering the cylinder of valve $G^5$ passes through it to the pipe $P^5$. In so far as the operation as just described, it is the same with direct current or alternating current.

In direct current operation, air passes from the pipe $P^5$ to pipe $P^8$ directly, to the pipe $P^9$ through the valve $F^2$, and to the pipe $P^6$ through the valve $F'$. Air passing through pipe $P^8$ and cut out valve $H^4$ operates the actuators $K^5$ for the valves I in the branches $O^9$ and $O^{10}$ of the constant pressure supply system. This brings about the energization of actuator 10 but not of switch actuator 9 because the branch $O^9$ is controlled by a second valve I with its actuator $K^5$ and the latter is not operated under these conditions. From pipe $P^9$ air passes through the pipe $P^{90}$, cut out valve $H^3$ and pipe $P^{91}$ to the actuator $K^5$ for the valve I in the pipe $O^{15}$ whereupon the switch actuator 15 is energized. Through pipe $P^6$ air passes to the controller $KA^5$ connected to the valve I in branch pipe $O^{21}$ to thereby actuate the switch actuator 21 and also close the direct current line switch $S^{21}$. Thus it will be seen that in direct current operation, when the master controller valve is swung into the first position, the switches $S^{10}$, $S^{15}$ and $S^{21}$ are closed. When thereafter the master controller valve A is moved successively to the second, third, fourth and fifth positions, air is admitted to the train pipe PB successively through valves $C^{20}$, $C^{30}$, $C^{40}$ and $C^{50}$ at the corresponding pressures. This pressure transmitted through the pipe $P^6$ operates the valve actuators $K^{20}$, $K^{30}$, $K^{40}$ and $K^{50}$ controlling the valves in the pipes $O^{16}$, $O^{17}$, $O^{18}$ and $O^{19}$ to thereby energize the switch actuators 16, 17, 18 and 19 successively in the order enumerated with a consequent closure of the switches $S^{16}$, $S^{17}$, $S^{18}$, and $S^{19}$.

Should at any time either before, during, or after closure of the switches $S^{10}$, $S^{15}$, $S^{21}$, $S^{16}$, $S^{17}$, $S^{18}$ and $S^{19}$ as described the operation of the trip coil ND cause the valve I in the pipe $O^{210}$ to be opened, it is necessary in order to restore the connections to first move the controller valve A into the neutral position and then to turn the valve E into the position in which air at five pounds pressure is admitted from the constant pressure supply system O, valve E, valve $C^5$, and the pipe Q, to the train pipe QA. From the train pipe QA, air passes through the pipe $Q'$ to the valve $F^7$, and from the valve $F^7$ through the pipe $Q^2$ back to the valve $F^6$, and from there through the pipe $Q^4$ to the resetting device $KN^5$ which is actuated to permit the valve I in the pipe $O^{210}$ to be closed whereupon the motors may be brought up to speed by operating the master controller valve A as described in the preceding paragraph.

In the alternating current operation, air passes from the pipe $P^5$ through the valve $F^5$, to the pipe $P^{12}$, through the valve $F^4$ to the pipe $P^{11}$, through the valve $F^3$ to the pipe $P^{10}$, through the valve $F'$ to the pipe $P^7$, and also directly to the pipe $P^8$. The air admitted to the pipe $P^{12}$ passes through it and the cut out valve $H'$ to the actuator $K^5$ for the valve I in the supply system branch $O^{11}$ whereupon the switch actuators 11 and 12 are energized and the switches $S^{11}$ and $S^{12}$ closed. The air admitted to the pipe $P^{11}$ operates the actuator $K^5$ for the valve I in the branch $O^{13}$ of the supply system, thereby actuating the switch actuators 13 and 14 and closing switches $S^{13}$ and $S^{14}$. The air admitted to the pipe $P^{10}$ operates the connected actuator $K^5$ and opens the corresponding valve I in the supply system branch $O^9$, and at the same time the air admitted to the pipe $P^8$ operates the two actuators $K^5$ connected to the pipe $P^8$ to open the corresponding valve I in the supply system branches $O^9$ and $O^{10}$, and in consequence the switch actuators 9 and 10 are energized, closing switches $S^9$ and $S^{10}$. The air admitted through the pipe $P^7$ first actuates the valve actuator $KA^{10}$ connected to the valve I in the supply system branch pipe $O'$ and thereby brings about the energization of switch actuator 1 and the closure of switch $S'$. The energization of switch actuator 1 opens the valve J in the pipe $O^{61}$. This in turn operates the valve actuator $KA^0$ connected to the valve I controlling the supply system branch pipe $O^2$, whereby switch actuator 2 is energized and switch $S^2$ closed. Similarly, the energization of switch actuator 2 brings about the energization of actuator 3, and the energization of actuator 3 brings about the energization of actuator 4 through the valves J in the pipes $O^{71}$ and $O^{81}$ controlled by the actuators 2 and 3. When thereafter the master controller A is turned into the second position in which air is supplied to the train pipe PB through the valve $C^{20}$ at twenty pounds, the only change produced in the system is caused by the energization of the valve actuator $K^{20}$ connected to the pipe $P^7$ and controlling the valve in the constant pressure supply system $O^5$. The air then passing to the outlet side of the controlling valve in the pipe $O^5$ first restores the actuator $KA^{10}$ to the normal condition and thereby deënergizes the switch actuator 1, and after the latter is deënergized and the valve $JA^5$ in the pipe $O^5$ is opened, energizes the switch actuator 5 and thereby closes the switch $S^5$. Similarly, the master controller is shifted to progressively pass air to the train pipe PB at pressures of 30, 40 and 50 pounds through valves $C^{30}$, $C^{40}$ and $C^{50}$, respectively, the actuators $K^{30}$, $K^{40}$ and $K^{50}$ connected to the pipe $P^7$ are actuated in succession and switch actuators 2, 3 and 4 deënergized in the order named, and the switch actuators 6, 7 and 8 energized in the same order.

In alternate current operation, before moving the master controller valve A out of the neutral position it is first necessary to throw the valve E into the position in which air passes from the supply system O through the valve E and pressure reducing valve $C^{10}$ at a pressure of ten pounds to the train pipe QA in order that the pantagraph may be held in the working position. This is accomplished by air passing from the pipe QA through the pipe $Q'$ to the valve $F^7$ and from thence through the pipe $Q^3$ to the actuator $K^{10}$ controlling the valves JA in the air supply branch pipes OU and OZ. When the actuator $K^{10}$ is energized the supply of air to the cylinder $U^6$ is cut off, whereupon the springs $U^7$ tend to throw the pantagraph into the operative position and at the same time air is admitted to the cylinder Z which unlocks the pantagraph and allows it to move into the operative position. In alternate current operation, should the trip coil NA be energized it is necessary to return the master controller A to the neutral position before the resetting device $KN^5$ of the trip coil can be energized. Since the air for operating the resetting device is supplied through the valve $F^7$, pipe $Q^2$, valve $F^6$ and pipe $Q^5$, pipe $Q^2$ is open when and only when switch actuators 10 and 12 are deënergized.

It sometimes happens that from accident or other cause it is necessary or desirable to connect one only of the two pairs of motors $M'$ and $M^2$, and $M^3$ and $M^4$, into service. To cut out the motors $M'$ and $M^2$ and at the same time operatively connect in the other pair of motors $M^3$ and $M^4$, I shift the cut out valves $H^3$ and $H^4$, a quarter turn clockwise and similarly shift valves $H'$ and $H^2$ to cut in motors $M'$ and $M^2$ and cut out motors $M^3$ and $M^4$. In direct current operation when it is desired to cut out motors $M'$ and $M^2$, a quarter turn of the valve $H^4$ interrupts the supply of air through the pipe $P^8$ for operating the actuators $K^5$ connected thereto and controlling the valves I in the supply branch lines $O^9$ and $O^{10}$. This movement of the valve $H^4$ therefore prevents the closure of the switches $S^9$ and $S^{10}$ controlled by the actuators 9 and 10, respectively. The quarter turn of the valve $H^3$ directly closes off the supply through pipe $P^{91}$ for energizing the actuator $K^5$ controlling the valve I in the branch pipe $O^{15}$ and thereby prevents the closure of the switch $S^{15}$ under these conditions. The quarter turn of the valve $H^3$ also serves to connect the pipe $P^{12}$ to the supply system O, the connection being through pipe $P^{120}$, pipe 90, pipe 9, and change over valve $F^2$ open in direct current operation. This results in the actuation of actuators 11 and 12 and the closure of switches $S^{11}$ and $S^{12}$ thus operatively connecting the motors $M^3$ and $M^4$ in circuit and effectually disconnecting the motors $M'$ and $M^2$.

In direct current operation when it is desired to connect motors $M'$ and $M^2$ in circuit and disconnect motors $M^3$ and $M^4$, movement of the valve $H'$, strictly speaking, is unnecessary, since with the valves $H^3$ and $H^4$ in their normal positions no flow of air can take place in the pipe $P^{12}$ regardless of whether the valve $H'$ is in the open or closed position. The rotation of the valve $H^2$, however, supplies air to the actuator $K^5$ controlling the valve I in the supply system branch $O^{13}$ and thus brings about the energization of the switch actuators 13 and 14 and the consequent closure of switches $S^{13}$ and $S^{14}$. The energization of switch actuators 13 and 14 serves through the valves JA, controlled by them, to effectually close the pipe $P^{91}$ thus preventing the effective energization of the actuator 15 controlling the switch $S^{15}$. The switch actuator 10 is energized in normal operation by actuator $K^5$ controlling the valve I in supply system branch $Q^{10}$. The closure of the switch $S^{10}$ and switches $S^{13}$ and $S^{14}$, coupled with the fact that the switch $S^{15}$ is prevented from closing under these conditions, serves to effectually connect the motors $M'$ and $M^2$ in service and to prevent the flow of current through motors $M^3$ and $M^4$.

In alternating current operation, the rotation of switch $H^4$ to the closed position by interrupting the flow of air through the pipe $P^8$ prevents the energization of actuators $K^5$ controlling the valves I in the supply system branches $O^9$ and $O^{10}$, this prevents the actuation of actuators 9 and 10 and the consequent closure of switches $S^9$ and $S^{10}$. The rotation of the valve $H^3$ is without real effect on the operation of the motors except that it cuts off the supply of air to the pipe $P^{91}$, although this is really of no moment because the energization of actuators 13 and 14 brought about by the air supplied through pipe $P^{11}$ to the actuator $K^5$ controlling the valve I to the branch pipe $O^{13}$ prevents the actuation of actuator 15 regardless of the air pressure in pipe $P^{91}$. The effective result of operating the valves $H^3$ and $H^4$ therefore in alternating current operation is to prevent the closure of switches $S^9$ and $S^{10}$. With the change over valves in the alternate current position the effect of shifting the cut out valves H' and H² is to interrupt the supply of air through pipe P¹² to the actuator K⁵ controlling the valve I in pipe O¹¹ to thereby prevent the energization of actuators 11 and 12 and the consequent closure of switches S¹¹ and S¹².

It will of course be readily apparent to those skilled in the art that a car equipped with my improved motor control apparatus as indicated generally by Figs. 1, 2, 3 and 4, may be employed alone or in conjunction with a number of similarly equipped cars connected together in a train and operated by a single master controller valve A and a single valve E. When a plurality of cars equipped with control apparatus as indicated are connected together in a train, the cut off valves OX, PX and QX (see Fig. 2) in the connections to the valves A and E, not in use, should be closed. Of course it will be apparent that a car equipped with my system as shown in Figs. 1 to 4, may be provided with controller valves at only one end of the car, but in many cases will be provided with controller valves at both ends of the cars, and in Fig. 3 I have shown pipe connections from the train pipes QA, PA and PB for the controller valves at the other end of the car.

While, in the preferred form of the invention as now contemplated by me, air for directly operating the various switch actuators, etc., located on each car is intended to be provided from a local air system including the air brake reservoir, or other suitable tank for compressed air, located on the car, it will be obvious that the air for operating the switch actuators, etc., on some of the cars might be furnished from one or more of the other cars in the train. In such case an additional train pipe for supplying this air may be used. In Fig. 11 I have shown an arrangement in which such a train pipe is employed, OA' representing the train pipe section for this purpose on one car and OA² and OA³ the corresponding train pipe sections on other cars. As shown in Fig. 11 a pipe OB on each car connected to the corresponding pipe section supplies the air employed on the car for operating the various switch actuators and other fluid actuated parts. As shown in Fig. 11 also, the cars to which the train pipes OA' and OA³ pertain, are supplied with compressors OC and receptacles for compressed air OR; and the car to which the train pipe OA² pertains is not provided with a tank or air compressor and is supplied with air from the train pipe sections OA' and OA³. Of course other combinations may be employed.

It will be readily apparent to those skilled in the art that the control apparatus described possesses numerous important advantages. To begin with, the apparatus, considering the functions performed, and in comparison with the apparatus heretofore employed for the same general purpose, is simple and reliable and may be easily understood, adjusted and repaired, by relatively unskilled attendants. The various valves may be simple in construction and essentially similar in construction, and because of this and because of the further fact that they need not be large and in practice are not large, are relatively inexpensive to manufacture and install, adjust and repair.

The use of air piping and pneumatic actuators for controlling valves which in turn control pneumatic switch actuators possesses important practical advantages over the system of motor control now in commercial use in which pneumatic actuators for the main circuit switches are controlled by electromagnetic and electric control circuits. In the latter system, as ordinarily used, the voltage in the control circuit is comparatively low and the switches are apt to get out of order because of dust and particles of dirt getting on the switch contacts. With my system also there is plenty of power for the quick and positive actuation of all of the valves and pneumatically actuated devices. There is also a practical advantage of some importance in the use of a pneumatic control system for pneumatic switch actuators in the place of an electric circuit control of such actuators, due to the fact that many operators and attendants find less difficulty in operating, adjusting and repairing pneumatic apparatus and piping than they have with electrical apparatus and wiring. For instance, this type of motor control system is frequently installed in railway systems in which the train men are not initially familiar with electrical apparatus but are familiar with steam and air apparatus. The motormen in such systems are frequently locomotive engineers compelled to change their occupation by the conversion of the motive power of the railway system from steam to electricity. It is perfectly obvious that a locomotive engineer would have less difficulty in repairing or adjusting a small air valve than he would have in finding and correcting a fault in an electric switch.

By employing one air system for supplying the air to operate the switch actuators and perform other operations involving any considerable use of air and employing a second air system or air systems in which the pressure may be varied to selectively control the supply of air from the first mentioned system to the devices operated thereby, certain very substantial advantages are had. The fact that only a small quantity of air is required to operate the various devices directly operated by air from the variable pressure system, permits of the use of small, quick acting, valves in that system and permits of the quick variations of pressure in the variable pressure system necessary or at least highly desirable for the satisfactory use of a system employing a plurality of pneumatic devices selectively responsive to the varying pressures in said system. The fact that the small consumption of air in the variable pressure system facilitates quick changes of pressure in that system is of particular importance in operating trains containing a plurality of motor cars. For instance, the system disclosed will operate satisfactorily with trains composed of six, eight, ten or even more long, heavy motor cars.

While in accordance with the provisions of the statutes I have herein described and illustrated the best form of my invention now known to me, it will be apparent to those skilled in the art that many changes may be made in the form of the apparatus disclosed without departing from the spirit of my invention, and also that some features of my invention may be used with advantage under some circumstances without a corresponding use of other features of the invention, and I do not wish the claims hereinafter made to be limited to the particular apparatus or mode of use disclosed herein more than is made necessary by the state of the art.

Having now described my invention, what I claim as new, and desire to secure by Letters Patent, is:

1. The combination, with a plurality of electrical circuit branches and switches for connecting said branches in different combinations, of a pneumatic actuator for each switch, an air supply system, valves connecting the various pneumatic devices to said air supply system, a second air supply system, pneumatic actuating devices for the valves connected to said second air supply system and progressively responsive to different pressures in that system, and means for varying the pressure in said second air supply system by a series of predetermined and definite steps to thereby actuate said devices as desired.

2. The combination, with a plurality of motor circuit connections and switches for connecting them in various combinations, of a pneumatic actuator for each switch, an air supply system, valves for connecting the various actuators to the air supply system, a second air supply system, pneumatic actuating devices for the valves connected to said second air supply system and progressively responsive to different pressures in said second air supply system, and means for creating and maintaining an air supply in said second air supply system of any one of a series of predetermined and definite values to thereby operate said devices as desired.

3. The combination, with a plurality of motor circuit connections and switches for uniting them in various combinations, of a pneumatic controller for each switch, an air supply system, means connecting the various controllers to said air supply system, a second air supply system, a pneumatic actuator for each valve connected to said second air supply system and responding progressively as the pressure therein is varied, and means for supplying air to the second air supply system at different pressures, comprising a valve having a plurality of successively opened outlet ports and connections between the various outlet ports and the second system, each including a pressure reducing valve, the various pressure reducing valves tending to maintain different pressures at their outlet sides.

4. In a system for controlling the motors of one or more motor driven cars, the combination of a train pipe, a master controller in the form of a valve having a plurality of successively opened outlet ports each connected to the train pipe through an individual connection including a pressure reducing valve, the pressure reducing valves in the various sections being set to open at different pressures, a second air supply system having a connection to the supply port of said valve, a plurality of pneumatic controllers on each car, valves connecting said controllers to said supply system, and pneumatic actuators for said valves connected to said train pipe and adapted to respond progressively as the pressure therein is varied.

5. In a motor control system, a reverser, a piston and cylinder for actuating the same, an air supply system with branches running to opposite ends of the cylinder, a normally closed valve in each branch, a pneumatic actuator for and adapted to open each valve, a second air supply system, and means for connecting either of said actuators at will to said second system.

6. In a system of control for the motors of one or more cars, the combination with two train pipes and means for supplying air under pressure at will to either train pipe, of controlling apparatus on each car comprising a reverser, a piston and cylinder for actuating the reverser, an air supply system having branches connected to the opposite ends of the cylinder, a normally closed valve in each branch, and a pneumatic actuator for each valve, the two actuators being connected one to one end and the other to the other of the two train pipes and each serving to open the valve to which it pertains when pressure is maintained in the corresponding train pipe.

7. In a system of control for the motors of one or more cars, the combination with two train pipes and means for supplying air under pressure at will to either train pipe, of controlling apparatus on each car comprising a reverser, a piston and cylinder for actuating the reverser, an air supply system having branches connected to the opposite ends of the cylinder, a normally closed valve in each branch, and a pneumatic actuator for each valve, the two actuators being connected one to one, and the other to the other, of the two train pipes, and each serving to open the valve to which it pertains when pressure is maintained in the corresponding train pipe, a series of pneumatically operated switch controlling devices, and a valve mechanism connected to and operated by the reverser for connecting said devices to whichever train pipe has pressure maintained therein, and disconnecting them from the other train pipe.

8. In a system for controlling the motors on one or more cars, the combination with two train pipes and a master controller having two series of outlet ports opened successively as the valve is moved in one direction or the other from a central position, individual connections between the various outlet ports of one series and one train pipe, and between the various outlet ports of the other series and the other train pipe, each connection including an automatic pressure reducing valve, the various pressure reducing valves in each series of connections tending to progressively vary the pressure in the corresponding train pipe as they are cut in one after another by the movement of the controlling valve, a pneumatic reverser on each car, a plurality of switch controlling devices on each car, connections between the train pipes and the reverser whereby the reverser is held in one position or the other accordingly as pressure is maintained in one or the other of the train pipes, and means operated by each reverser for connecting the devices on its car to the train pipe in which pressure is maintained, said devices responding progressively as the pressure in the train pipe to which they are connected is varied.

9. In a motor control system, the combination with motors adapted to be operated with either direct or alternating current, a group of pneumatic switch actuating devices exclusively for use with direct current, a group of pneumatic switch actuating devices exclusively for use with alternating current, an air supply system, a master controller for varying the pressure therein at will, change over valves adapted when in one position to connect one group of said devices and when in another position to connect the other group of said devices to said supply system.

10. In a motor control system, the combination with motors adapted to be operated with either direct or alternating current, a group of pneumatic switch actuating devices exclusively for use with direct current, a group of pneumatic switch actuating devices exclusively for use with alternating current, an air supply system, a master controller for varying the pressure therein at will, change over valves adapted when in one position to connect one group of said devices and when in another position to connect the other group of said devices to said supply system, the devices of each group responding progressively when connected to said system as the pressure therein increases.

11. In a motor control system, the combination with motors adapted to be operated with either direct or alternating current, a group of pneumatic switch actuating devices exclusively for use with direct current, a group of pneumatic switch actuating devices exclusively for use with alternating current, an air supply system, a master controller for varying the pressure therein at will, change over valves adapted when in one position to connect one group of said devices and when in another position to connect the other group of said devices to said supply system, and means for automatically shifting said change over valves from one position into the other position accordingly as alternating current or direct current is supplied to the system.

12. In a motor control system, the combination with motors adapted to be operated with either direct or alternating current, of a group of pneumatic switch actuating devices exclusively for use with direct current, a group of pneumatic switch actuating devices exclusively for use with alternating current, some of the devices of each group being energized only when supplied with air under pressure greater than that required for the operation of other actuators in each group, an air supply system, change over valves adapted when in one position to connect one group of said devices to said system and when in another position to connect the other group of said devices to said system, and a master controller for varying the pressure in the air supply system to thereby progressively actuate the devices of whichever group may be connected to the system.

13. In a motor control system, the combination with motors adapted to be operated with either direct or alternating current, of a group of pneumatic switch controlling devices exclusively for use with direct current, a group of switch actuating devices exclusively for use with alternating current, an air supply system, and a master controller for varying the pressure in said system at will by a number of predetermined steps, change over valves adapted when in one position to connect one group of said devices to said system and when in another position to connect the other group of said devices to said system, said devices of each group being arranged to be energized when connected to said air supply system progressively as the pressure in the latter is varied by said steps.

14. In a motor control system, the combination with motors adapted to be operated with direct or alternating current, of a group of pneumatically operated resistance controlling devices, a group of pneumatically actuated transformer connection controlling devices, a group of pneumatically operated motor switch controlling devices, an air supply system, a master controller for varying the pressure therein at will, change over valves adapted to connect the resistance controlling devices to and disconnect the transformer connection controlling devices from said system in one position of the valves and in another position to disconnect the resistance controlling devices from and connect the transformer connection controlling devices to said system, and in either position to connect appropriate ones of said motor switch controlling devices to said system, said motor switch controlling devices being responsive to the pressure in the air supply system less than that required for energizing any of the other devices, and some of the resistance controlling and some of the transformer connection controlling devices being responsive only to a pressure greater than that required for operating others of such devices.

15. In a motor control system, a plurality of pneumatic switch controllers divided into two groups, an air supply system having a branch running to each controller, a controlling valve in each branch and an individual pneumatic actuator therefor, a second valve in each branch running to one group of controllers and operatively connected to a corresponding controller of the other group to be closed when said controller is energized and opened when said controller is deënergized, means for operating the valve actuators of the first group and thereafter progressively operating the valve actuators of the second group, and means whereby the actuation of each valve actuator of the second group causes the corresponding controller of the first group to be deënergized.

16. In a motor control system, a plurality of pneumatic switch controllers divided into two groups, an air supply system having a branch running to each controller, a controlling valve in each branch and an individual pneumatic actuator therefor, a second valve in each branch running to one group of controllers and operatively connected to a corresponding controller of the other group to be closed when said controller is energized and opened when said controller is deënergized, means for operating the valve actuators of the first group and thereafter progressively operating the value actuators of the second group, said means comprising a variable pressure air supply system to which the actuators of the second group are connected, said actuators responding progressively to successively increasing pressures in said second system, and means whereby the actuation of each valve actuator of the second group causes the corresponding controller of the first group to be deënergized.

17. In a motor control system, a plurality of switch controllers divided into two groups, an air supply system running to each controller, a controlling valve in each branch and an individual pneumatic actuator therefor, a second valve in each branch running to one group of controllers and operatively connected to a corresponding controller of the other group to be closed when said controller is energized and opened when said controller is deënergized, means for operating the valve actuators of the first group and thereafter progressively operating the valve actuators of the second group, and means comprising a pipe connection between the outlet side of the valve controlled by each valve actuator of the second group and the valve actuator for the corresponding controller of the first group, whereby the actuation of each valve actuator of the second group causes the corresponding controller of the first group to be deënergized.

18. In a motor control system, a plurality of pneumatic switch controllers divided into two groups, an air supply system including branches running one to each controller, a valve in each branch and a pneumatic actuator therefor, a second valve located in each branch running to one group of controllers and connected to a corresponding controller of the other group to be closed except when the controller to which it is connected is deënergized, means for operating the valve actuator for one controller of said other group, means for progressively actuating the remaining valve actuators of said other group comprising a valve for each of said valve actuators controlling its energization and operated by that controller of the group which is energized immediately prior to the energization of the last mentioned valve actuator, means for progressively operating the valve actuators of said one group, and pneumatic means actuated on the energization of the valve actuator of each of the said one group for closing the valve in the supply branch running to the corresponding controller of the first group.

19. In a motor control system, a plurality of pneumatic switch controllers divided into two groups, an air supply system, mechanism for operatively connecting the controllers of one group to said system, said mechanism including a single pneumatic actuating device for starting said mechanism into operation, and a plurality of pneumatic actuating devices one for each controller of the other group, all of said pneumatic devices being connected to the second air supply system, and being actuated progressively as the pressure therein is varied, and means for progressively varying the pressure in said second air supply system through as many steps as there are devices connected thereto.

20. In a motor control system, a plurality of pneumatic switch controllers divided into two groups, an air supply system, mechanism for operatively connecting the controllers of one group to said system, said mechanism including a single pneumatic actuating device for starting said mechanism into operation, and a plurality of pneumatic actuating devices one for each controller of the other group, all of said pneumatic devices being connected to the second air supply system, and being actuated progressively as the pressure therein is varied, and means for progressively increasing the pressure in said second air supply system through as many steps as there are devices connected thereto, said single device being actuated by a pressure in said second system lower than that required for operating any of the other of said devices.

21. In a motor control system, a plurality of switches and means for operating said switches successively in regular order comprising a pneumatic controller for each switch, an air supply system for supplying air for actuating said controllers, a pneumatic device for connecting one of said controllers to said system, means whereby the actuation of that controller of each controller in the group but the final one causes the following controller in the group to be operatively connected to said system and a variable pressure system to which said device is connected and is operated by the pressure therein.

22. In a motor control system, a line switch, a plurality of speed controlling switches, a controller, and connections for operating said switches in a predetermined manner, an overload release for the line switch, a device for preventing the line switch from being closed after its release until said device is operated, pneumatic means for actuating said device, and interlocking means preventing the operation of said pneumatic means except when the controller is in the off position.

23. In a car motor control system, a line switch, a plurality of speed controlling switches, pneumatic actuators for the switches, means for operating them including a train pipe and a master controller, an overload release for the line switch, a pneumatic device for holding the line switch open when released until said device is actuated, pneumatic means for actuating said device comprising a train pipe, and a controlling valve, and means preventing the flow of air to said device to operate it except when the master controller is in the off position.

24. In a car motor control system, the combination with motors adapted to be operated with either direct or alternating current, of a direct current supply line, and a line switch therein, an alternate current supply line, and a line switch therein, a pneumatic actuator for each line switch, a train pipe, and means responsive to the supply of current to one or the other of said lines for connecting the corresponding actuator to said train pipe.

25. In a motor control system, the combination, with a current collector, of a pneumatic device for moving the collector to an inoperative position, an air supply system, a normally open valve connecting the device to said system, a lock for holding the collector in the inoperative position, a device for moving the lock to an inoperative position, and means for causing said valve to close when said last mentioned device is operated.

26. In a motor control system, the combination, with a current collector, of a pneumatic device for moving the collector to an inoperative position, an air supply system, a normally open valve for connecting the device to said system, a lock for holding the collector in the inoperative position, a pneumatic device for moving the lock to an inoperative position, a normally closed valve connecting the last mentioned device to said air supply system, said valves being connected so that one opens when the other closes, and means for moving said valves out of their normal position.

27. In a car motor control system, the combination, with a car, of a current collector, a pneumatic device for moving the collector to an inoperative position, an air supply system including the air brake reservoir on the car, a normally open valve connecting the device to said system, a lock for holding the collector in the inoperative position, a pneumatic device for moving the lock to an inoperative position, a normally closed valve connecting said last mentioned device to said air supply system, said valves being connected so that one opens when the other closes, and a second air supply system including a train pipe and a controlling valve for moving said valves out of their normal positions.

FREDERIC W. DARLINGTON.

Witnesses:
ARNOLD KATZ,
D. STEWART.

Copies of this patent may be obtained for five cents each, by addressing the " Commissioner of Patents, Washington, D. C."